United States Patent
Dorr (10) Patent No.: US 7,864,717 B2
(45) Date of Patent: Jan. 4, 2011

(54) MODEM FOR COMMUNICATING DATA OVER A VOICE CHANNEL OF A COMMUNICATIONS SYSTEM

(75) Inventor: Barry L. Dorr, Carlsbad, CA (US)

(73) Assignee: Flextronics Automotive Inc., Ontario (CA)

( * ) Notice: Subject to any disclaimer, the term of this patent is extended or adjusted under 35 U.S.C. 154(b) by 1311 days.

(21) Appl. No.: 11/327,444

(22) Filed: Jan. 9, 2006

(65) Prior Publication Data

US 2007/0160124 A1    Jul. 12, 2007

(51) Int. Cl.
*H04L 12/16* (2006.01)

(52) U.S. Cl. ............... 370/267; 370/252; 370/352; 370/266; 370/503

(58) Field of Classification Search .......... 370/204, 370/108, 118, 119, 144, 151, 102, 266, 267, 370/503
See application file for complete search history.

(56) References Cited

U.S. PATENT DOCUMENTS

| 3,696,298 | A | * | 10/1972 | Kahn et al. | 455/59 |
|---|---|---|---|---|---|
| 3,716,790 | A | * | 2/1973 | Romoser | 340/7.49 |
| 4,224,596 | A | * | 9/1980 | Knickel | 340/992 |
| 5,471,527 | A | * | 11/1995 | Ho et al. | 379/347 |
| 5,479,562 | A | * | 12/1995 | Fielder et al. | 704/229 |
| 5,504,833 | A | * | 4/1996 | George et al. | 704/211 |
| 6,078,879 | A | * | 6/2000 | Taori et al. | 704/207 |
| 6,493,338 | B1 | * | 12/2002 | Preston et al. | 370/352 |
| 6,493,388 | B1 | | 12/2002 | Wang | |
| 6,496,797 | B1 | * | 12/2002 | Redkov et al. | 704/220 |
| 6,690,681 | B1 | | 2/2004 | Preston et al. | |
| 7,236,059 | B2 | * | 6/2007 | Stevenson et al. | 331/46 |
| 2004/0093206 | A1 | * | 5/2004 | Hardwick | 704/221 |

FOREIGN PATENT DOCUMENTS

| EP | 1 179 820 A2 | 2/2002 |
|---|---|---|
| WO | WO 99/31895 | 6/1999 |
| WO | WO 01/72067 | 9/2001 |
| WO | WO 03/071521 | 8/2003 |

* cited by examiner

*Primary Examiner*—Ricky Ngo
*Assistant Examiner*—Dewanda Samuel
(74) *Attorney, Agent, or Firm*—Patton Boggs LLP (57) ABSTRACT

A modem used for communicating data. The modem may include a packet generator and modulator. The modulator may include an electronic device configured to select at least one frequency from at least three or more candidate frequencies. At least one oscillator may be in communication with the electronic device and configured to generate respective oscillation signals in response to receiving the frequency(s) from the electronic device. A computational element may be in communication with the oscillator(s) and be configured to receive the oscillation signal(s) and produce a modulated audio signal based on the oscillation signal(s).

12 Claims, 5 Drawing Sheets

MODEM FOR COMMUNICATING DATA OVER A VOICE CHANNEL OF A COMMUNICATIONS SYSTEM

BACKGROUND OF THE INVENTION

Data communications over communications systems have traditionally been performed using a modem. Data communications over a public switch telephone network ("PSTN") is performed over a voice channel, as there are no data channels on this communications system. However, cellular networks have both data and voice channels over which data may be communicated.

Data communications, as opposed to voice communications, may be utilized for a variety of purposes. One such purpose is vehicle telematics. Vehicle telematics are generally considered to need immediate communication capability due to various safety and security concerns for drivers. For example, in the case of emergency, a communication may need to be communicated from a vehicle to a call center. Generally, vehicle telematics systems utilize bi-directional data transmission between vehicles and call centers.

Because of vehicle equipment costs constraints, data and voice communications for vehicle telematics generally utilize a cellular communications system. Since "safety and security" is a large part of these systems, data communications between the vehicle and call center should be delivered quickly and reliably. North American vehicle telematics suppliers face the challenge of providing coverage over the entire continent, which necessarily includes coverage using three different existing cellular technologies, which are AMPS, GSM, and CDMA. Two of these cellular technologies, GSM and CDMA, provide data channels for communicating data; AMPS does not provide a data channel as AMPS is an analog communications system. The data channels of CDMA and GSM rely on IP protocols, where message delivery time may range from several seconds to several hours, thereby rendering the data communication path inferior for safety and security purposes of vehicle telematics or other uses of data communications that have a need or desire for substantially real-time communications. Furthermore, different cellular technologies use different protocols and equipment, thereby adding complexity to call centers. As a result, timely data transmission is not possible utilizing data channels of existing cellular technologies and a need exists for data communications that can deliver data quickly and easily over all cellular technologies.

The voice channel of all cellular communications systems provides a low-delay audio path between users, and audio is a common element between all cellular technologies. It is, therefore, natural to use this path for data communication, such as vehicular telematics, to avoid complications using data channels because of timeliness of the data channels and the fact that AMPS does not include a data channel.

While other data communications have attempted to utilize the voice channel for communicating data over a cellular network, these attempts have been or will be problematic due to configuration limitations of the voice channels that are inherent in cellular communications as well as other communications systems. Nearly all cellular telephones in use today use digital voice compression in order to efficiently utilize their allocated radio spectrum. The cellular system component that compresses speech prior to transmission and then expands it after reception is called a voice compressor or a vocoder. As understood in the art, vocoders are located within mobile phones and base stations for transmitting and receiving. Transmitting modulated data through a vocoder using traditional magnitude and phase modulation is impractical because the vocoder preserves neither, as magnitude and phase modulation are not critical for the psycho-acoustical process of human voice communication. Furthermore, traditional magnitude and phase modulation for data communication is frequently recognized by the transmitting vocoder as a non-voice signal and filtered out prior to transmission, thereby making the data-bearing signal unavailable at the receiver.

Conventional modems use various combinations of amplitude and phase modulation to transmit data. Examples are Binary Phase Shift Keying (BPSK), Quadrature Phase Shift Keying. (QPSK), Quadrature Amplitude Modulation (QAM), Minimum Shift Keying (MSK), Gaussian Minimum Shift Keying (GMSK), Frequency Shift Keying (FSK), and Amplitude Shift Keying (ASK). One drawback of these techniques is that they encode information using amplitude and phase. Since the psycho-acoustical process of human hearing is relatively insensitive to both of these parameters, voice compressors (i.e., vocoders) do not preserve amplitude and phase, and therefore, the amplitude and phase information is not transmitted reliably.

Another class of modems uses Orthogonal Frequency Division Multiplexing (OFDM). This modulation transmits multiple carriers simultaneously with each carrier modulated with QAM modulation. This modulation further transmits with all carriers simultaneously on. OFDM is unsuitable for transmitting through vocoders because the QAM modulation on each carrier is not preserved by the vocoder.

Dual Tone Multi Frequency (DTMF) can be used to transmit data over audio channels. This modulation uses two groups of four tones and each symbol consists of one tone from each group, resulting in four information bits per symbol. DTMF tone frequencies were specifically designed to avoid harmonic relationships. One drawback of DTMF is that since the frequencies are not harmonically related it is difficult for the pitch predictor in the vocoder to represent them. A second drawback is that DTMF frequencies occupy a relatively narrow (697-1633 Hz) frequency range and can be attenuated or eliminated by the noise canceller in the vocoder.

One commercially available modem uses the presence or absence of a set of four candidate tones to encode four bits per symbol. This modem is conventional because it simply uses four Amplitude Shift Keying (ASK) carriers. One drawback of this modem is that the amplitudes of the tones are not represented accurately by the vocoder, which makes it difficult for the demodulator to detect whether a tone was sent or not. Individual tones are attenuated by the vocoder based on the composite structure of the signal and history of past signals and future of incoming signals cannot be relied on as the amplitude is inaccurate. The receiver using threshold detection to detect the presence or absence of a tone is similarly inaccurate due to the amplitude being inaccurate.

Current vocoders compress voice at bit rates between 2,000 and 14,000 bits per second ("BPS"). The entropy or information content of toll-grade human speech is much lower (e.g., between 100 and 200 bits per second), suggesting that future vocoders will operate at much lower rates. There are currently several modems available for use with cellular telephony. These modems use conventional modem waveforms that are not producible by the human vocal tract, and they send data at rates well above the entropy rates. This suggests that these conventional modems are taking advantage of the inefficiency of state-of-the-art vocoders, and will unlikely operate correctly when the cellular operators adopt newer, lower rate vocoders. Deployment of these conventional modems has been limited for this reason.

SUMMARY OF THE INVENTION

In overcoming the problems of conventional data communications over voice channels of communications systems, especially those utilizing compression technologies, such as vocoders, the principles of the present invention encode data in a modulated audio signal that is structurally similar to human speech. The modulated audio signal may include a harmonic structure of a pitched voice signal, a formant structure similar to that produced by a human vocal tract, and a time-varying spectrum similar to that produced by a human voice signal. By encoding the data into a signal that is structurally similar to human speech, the signal may be communicated over voice channels of a communications system that utilizes compression technology without losing or affecting the data.

In one embodiment, the principles of the present invention include a modulator for modulating data. The modulator may include an electronic device configured to select at least one frequency from at least three or more candidate frequencies. At least one oscillator may be in communication with the electronic device and configured to generate respective oscillation signals in response to receiving the frequency(s) from the electronic device. A computational element may be in communication with the oscillator(s) and be configured to receive the oscillation signal(s) and produce a modulated audio signal based on the oscillation signal(s).

Another embodiment according to the principles of the present invention may include a modem that includes a modulator having an electronic device configured to select at least one frequency from at least three or more candidate frequencies. At least one oscillator may be in communication with the electronic device and be configured to generate respective oscillation signals in response to receiving the frequency(s) from the electronic device. A computational element may be in communication with the oscillator(s) and be configured to receive the oscillation signal(s) and produce a modulated audio signal based on the oscillation signal(s).

Another embodiment according to the principles of the present invention includes a system for communicating data over a voice channel. The system may include a modulator configured to receive digital data and generate a modulated audio signal containing the digital data and having characteristics including a harmonic structure and a formant structure. The system may further include a transmitter configured to transmit the modulated audio signal over a voice channel. The modulated audio signal may be composed of at least three frequencies. The system may further include a packet encoder in communication with the modulator and configured to generate packets of digital data used by the modulator to generate the modulated audio signal. A vocoder may compress the modulated audio signal prior to the transmitter transmitting the modulated audio signal. A receiver may receive the compressed modulated audio signal and a demodulator may be configured to demodulate the modulated audio signal to determine the digital data contained therein.

Still yet, the principles of the present invention include a demodulator for demodulating a modulated audio signal. The demodulator may include a processor configured to receive a modulated audio signal including at least one oscillation signal operating at at least one respective frequency selected from among at least three candidate frequencies, and determine which of the at least one frequency from among the at least three candidate frequencies the modulated audio signal includes. The determination of which of the frequency(s) is being communicated may be made by determining which of the frequency(s) have the highest signals from among the candidate frequency(s).

DETAILED DESCRIPTION

Figure 1A:
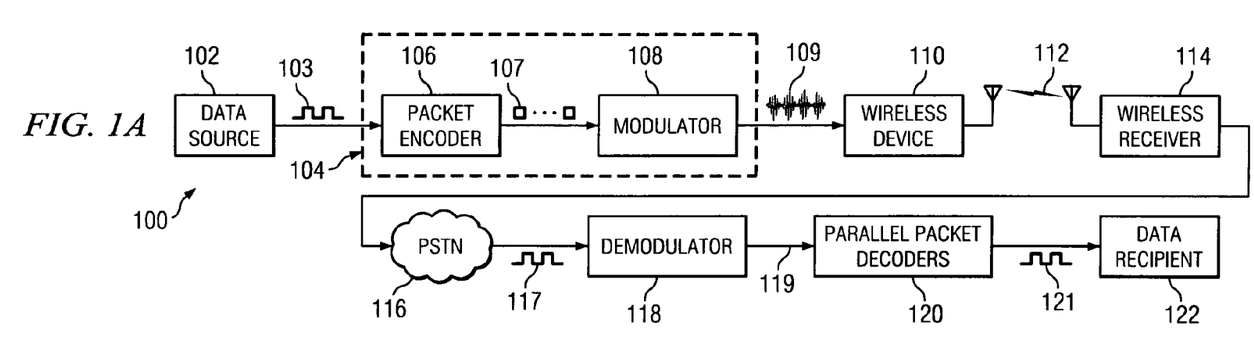
FIG. 1A is a block diagram of an exemplary communications system for communicating data that utilizes the principles of the present invention.

FIG. 1A is a block diagram of an exemplary communications system 100 that may utilize the principles of the present invention. The communications system 100 is capable of data transmission over a voice channel between a wireless device, such as a mobile telephone, and a fixed site, such as a call center that may be used for vehicle telematics. Data source 102 generates digital data 103. A modem 104 may include (i) a packet encoder 106 that generates data packets 107 and (ii) a modulator 108 that generates a modulated audio signal 109 based on the data packets 107. Separating long messages into data packets is well understood in the art and is a common technique for unreliable data transmission environments. For example, data packets are often used in public safety radio communications, amateur radio, cellular communications, and the Internet.

The modulated audio signal 109 is structured to have a harmonic structure of a pitched voice signal and a formant structure similar to that produced by the human vocal tract. In addition, the modulated audio signal 109 has a time-varying frequency spectrum to more closely resemble voice signals that inherently have a continuously changing frequency spectrum. A wireless device 110, such as a cellular handset, communicates the modulated audio signal 109. The wireless device 110 may include a vocoder (see, FIG. 1B) used for compressing voice signals to maximize bandwidth of the communications system 100. The wireless device 110 communicates a wireless signal 112 that includes the modulated audio signal 109 as processed by the wireless device 110 over a voice channel.

A wireless receiver 114, such as a cellular base station, may receive the wireless signal 112 via the voice channel and communicate the wireless signal 112 to a PSTN 116. A quantized audio signal 117, which contains the encoded data in the modulated audio signal 109, is communicated to a demodulator 118. The demodulator 118 demodulates the quantized audio signal 117 to form a demodulated signal 119, which is passed through a packet decoder 120 to decode the data stored in the demodulated signal 119 to produce data 121. The data 121, which is the same as the digital data 103, may be communicated to a data recipient 122, such as a call center, for timely delivery of the message.

Figure 1B:
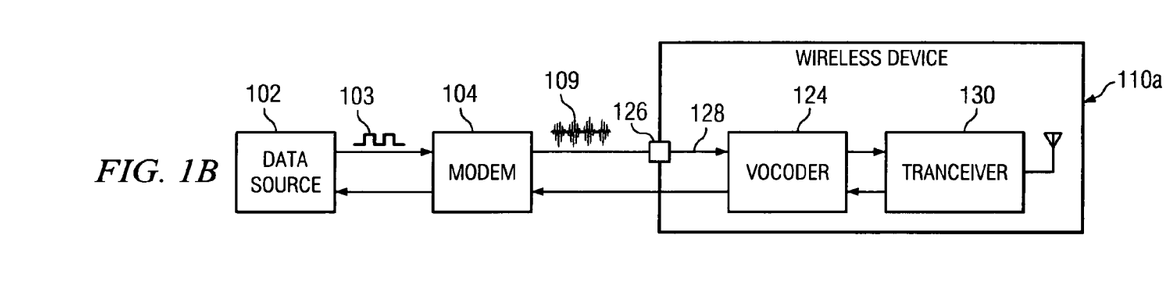
FIG. 1B is a block diagram of a modem configured in accordance with the principles of the present invention external to a wireless device.

FIG. 1B is a block diagram of a modem configured in accordance with the principles of the present invention external to a wireless device. The data source 102 may be connected to modem 104 to communicate digital data 103 thereto. The modem 104 may be configured as shown in FIG. 1A to generate the modulated audio signal 109 to be communicated to wireless device 110a. As shown, the modem 104 is physically located outside the wireless device 110a. In one embodiment, the wireless device 110a is a mobile telephone or other device configured to communicate voice signals over a cellular or other wireless communications system. In being configured to communicate voice signals, the wireless device 110a includes a vocoder 124 for compressing voice signals. As shown, the modem 104 connects to an external connector 126 that has an internal signal path 128 that leads directly or indirectly to the vocoder 124. In the case of connecting the modem 104 to a mobile phone, the connection between the modem 104 and wireless device 110a may include an external connector 126 typically used for an external audio headset as understood in the art. This configuration allows the modem 104 to be used with a large variety of mobile phones because the audio headset interface is nearly identical between mobile phone manufacturers. The vocoder 124 is in communication with a transceiver 130 for communicating the modulated audio signal 109 from the wireless device 110a.

Figure 1C:
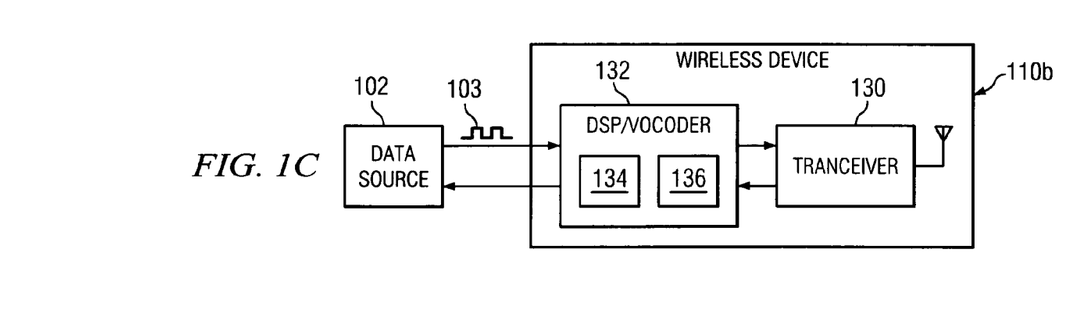
FIG. 1C is a block diagram of a modem configured in accordance with the principles of the present invention internal to a wireless device.

FIG. 1C is a block diagram of a modem configured in accordance with the principles of the present invention and internal to a wireless device 110b. The data source 102 communicates to the wireless device 110b. In this embodiment of the wireless device 110b, a digital signal processor ("DSP") 132 or other processor that executes software to perform the function of a vocoder 134 and modem 136. This configuration results in a lower cost system because the modem is realized by adding software to the DSP 132 already in the wireless device 110b. For this configuration, the digital data 103 is passed to the wireless device 110b via a proprietary connector on the wireless device 110b or via a Bluetooth wireless data connection. In any case, the modem 136 is capable of performing the same function of as the modem 104 of FIG. 1B. Similar configuration operations, dependent on the desired level of integration, exist for the connection to a PSTN. In an alternative embodiment, the modem and/or wireless device may be included in a controller. In one embodiment, the controller may be configured within a mode of transportation, such as an automobile.

Figure 2:
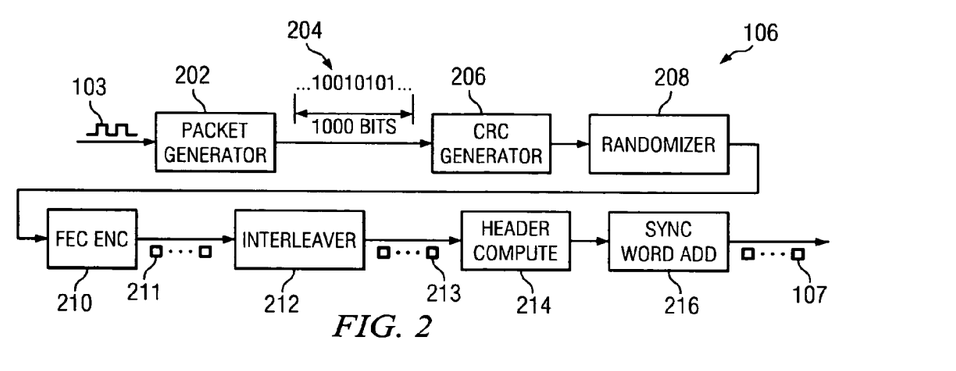
FIG. 2 is a block diagram of an exemplary packet encoder for use in encoding data packets in accordance with the principles of the present invention.

FIG. 2 is a block diagram of an exemplary packet encoder 106 for use in encoding data packets in accordance with the principles of the present invention. A packet generator 202 operates to separate the digital signal 103 that forms a data stream from the data source 102 (FIG. 1A) into data packets 204. In one embodiment, the data packets 204 are approximately 1,000 bits. A cyclic redundancy code ("CRC") generator 206 receives the data packets 204 and adds redundancy information that is used by a receiver to detect uncorrectable transmission errors after demodulation and error correction at the receiver 114 (FIG. 1A) as understood in the art. Other error codes could alternatively be utilized.

The output of the CRC generator 206 is communicated to a randomizer 208. The randomizer 208 inverts selected bits according to a pseudo-random sequence that is known by both transmitter and receiver of the communications system as understood in the art. A forward error correction (FEC) encoder 210 receives the output from the randomizer 208 and adds further redundancy information to the data packet. In one embodiment, a Reed-Solomon code (31, 21) may be utilized so that certain patterns of transmission errors can be corrected at the receiver 114 as understood in the art. It should be understood that other FEC coding techniques may be utilized. The FEC encoder 210 generates FEC codewords 211 as understood in the art.

An interleaver 212 may be configured to shuffle groups of bits in time so that transmission error bursts are spread over multiple FEC codewords 211, thereby further increasing the likelihood of successful error correction at the receiver. The interleaver 212 outputs a data packet that includes content and redundancy information. The data packet 213 may be approximately 1,500 bits long and include content that includes both data and redundancy information. It should be understood that the length of the data packets 213 may be longer or shorter depending upon specific implementation of the packet encoder 106.

A header compute function 214 is utilized to compute a header used by the receiver to determine certain aspects of the packet for demodulation prior to decoding. The header may include information about the packet, including the packet length and type of forward error correction used as understood in the art. The header information determined by the header compute function 214 may be appended to the front of the data packets 213.

A sync word add function 216 may append a synchronization (sync) word to the data packet that it is used by the receiver to mark the beginning of the data packet. In one embodiment, the sync word add function 216 appends the sync word to the front of the data packet 107, which may also have a header appended to the front of the data packet.

Figures 3, 4:
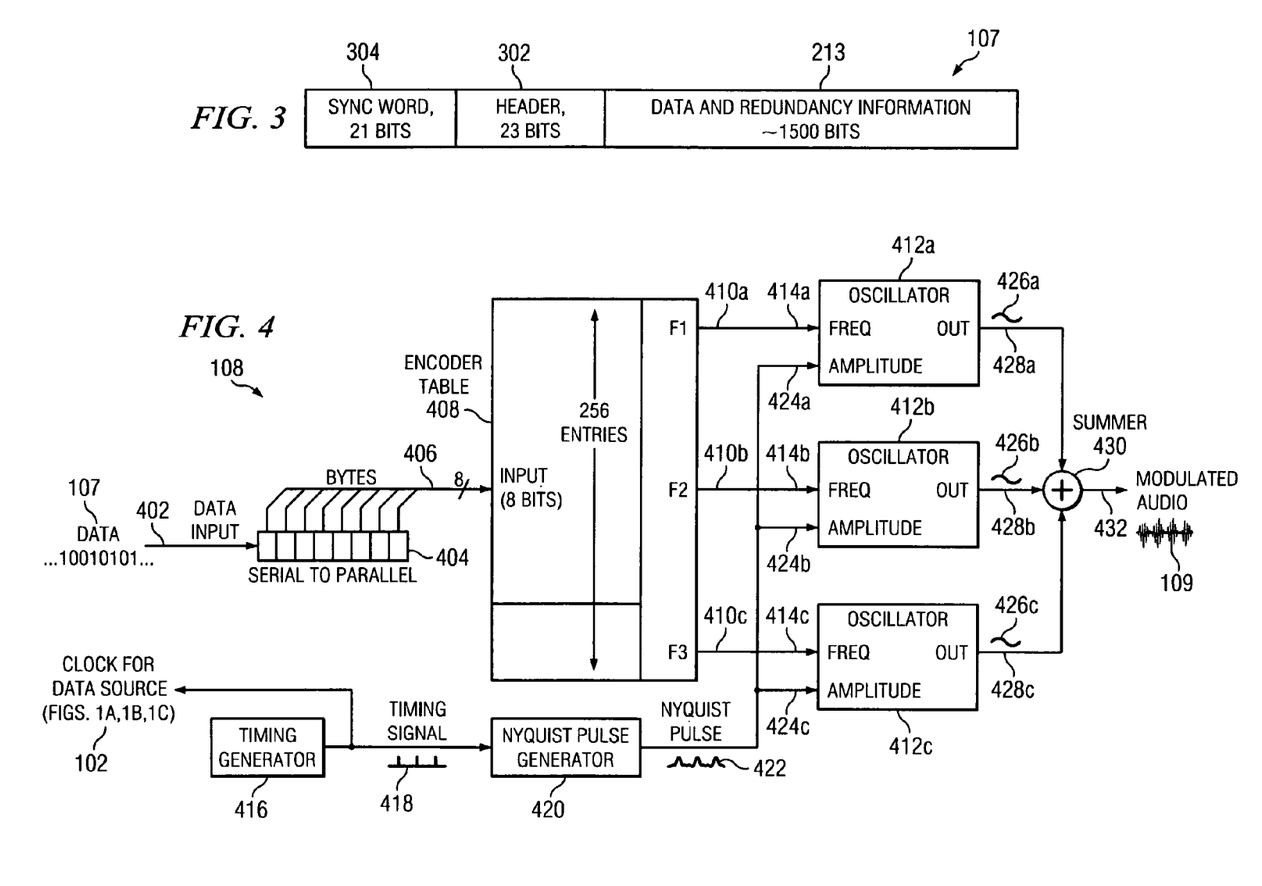
FIG. 3 is a block diagram representing an exemplary data packet produced by the packet encoder of FIG. 2.
FIG. 4 is a block diagram representing an exemplary modulator for generating a modulated audio signal in accordance with the principles of the present invention.

FIG. 3 is a block diagram representing an exemplary data packet 107 produced by the packet encoder 106 of FIG. 2. As shown, the data packet 107 includes three primary portions, a sync word 304, header 302, and data and redundancy information 213. It should be understood that the sync word 304 and header 302 may be located elsewhere or have some other configuration and provide the same or similar functionality in accordance with the principles of the present invention. However, by placing the sync word 304 at the front of the data packet 107, a receiver can determine the start of the data packet 107. The data and redundancy information includes data from the digital signal 103 (FIGS. 1 and 2) to which other operations have been performed to prepare the data packet 107 for delivery to the modulator 108 (FIG. 1A). In one embodiment, the sync word 304 is 21-bits long and the header is 23-bits long. It should be understood that the length of the sync word 304 and header 302 may be different, but still provide the same or similar functionality as having the sync word 304 be 21-bits in the header 302 be 23-bits. While the data and redundancy information may be approximately 1,500-bits, other lengths may also provide the same or similar functionality as provided by the principles of the present invention.

FIG. 4 is a block diagram representing an exemplary modulator 108 for generating a modulated audio signal in accordance with the principles of the present invention. The encoded packets 107 are outputted from the packet encoder 106 (FIG. 1A) and inputted into the modulator 108. The modulator 108 converts bits of the data packet 107 into modulated signals capable of being transmitted by a wireless device 110. The data packet 107 is considered to be a group of individual bits that are fed to an input line 402 of the modulator 108. The data packets 107 are communicated to the modulator 108 at a bit rate of FB (frequency of the bits) bits per second. Sequential bits of the encoded packet 107 are converted by a serial-to-parallel converter 404 into parallel words. The serial to parallel converter 404 may be an 8-bit converter. Alternatively, the serial-to-parallel converter 404 may be smaller or larger.

In using an 8-bit serial-to-parallel converter 404, bytes are produced at a symbol rate of FS (frequency of the symbols) that is exactly ⅛$^{th}$ of the FB bit rate. The outputs of the serial-to-parallel converter 404 are communicated on bus 406 to an encoder table 408. The encoder table 408 may be operated by a processor, such as a DSP, or other discrete hardware. A processor that operates the encoder table 408 may be used for other purposes within the modem, including operating the packet encoder 106. The encoder table 408 maps data bytes outputted from the serial-to-parallel converter 404 into unique combinations of three tone frequencies taken from a set of thirteen possible candidate tones or frequencies stored in the encoder table 408. Since there are 286 possible combinations of thirteen items taken three at a time, and only 256 unique binary patterns for a byte, thirty combinations are unused. In other words, 256 entries are stored in the encoder table 408. The encoder table has three outputs 410a, 410b, and 410c (collectively 410). The outputs 410 represent three different frequencies F1, F2, and F3 that are selected to produce the modulated audio signal 109 (FIG. 1A). Each of the frequencies F1-F3 is inputted to oscillators 412a, 412b, and 412c, respectively, via input lines 414a, 414b, and 414c, respectively. The oscillators 412a-412c receive the frequency signals F1-F3 on input lines 414a-414c, respectively.

In this embodiment, candidate tone frequencies are:

$$f = k \times \frac{8000}{67},$$

where k=3, 5, 7, ... 27, which have a harmonic relationship where the candidate tones are odd multiples of the fundamental frequency of 119.403 Hz, thereby allowing accurate representation by the pitch predictor in the vocoder. Other fundamental frequencies could alternatively be utilized. It should be understood that even multiples or a combination of even and odd multiples of the fundamental frequency may alternatively be utilized. The fundamental is not used in this embodiment because it happens to be out of the frequency range of the PSTN.

The frequencies F1-F3 represent three individual tone frequencies inputted into the respective oscillators 412a-412c. These oscillators are considered to be "frequency-agile" in that they are capable of generating any of the candidate tone frequencies. The oscillators are also phase coherent, meaning that frequency transitions do not cause instantaneous phase transitions that cause generation of undesirable harmonic content. A timing generator 416 is used to generate a timing signal 418. In one embodiment, the timing signal may be utilized to clock the data source 102 (FIG. 1A) and control a Nyquist pulse generator 420. Although the modem does not adapt to the exact bit rate of the data source, rate adaptation and "elastic" storage devices, such as those used in pulse coded modulation ("PCM") telephone links, may be utilized as understood in the art. The Nyquist pulse generator 420 produces a Nyquist pulse 422 that is inputted to the oscillators 412a-412c on input lines 424a-424c, respectively. In producing the Nyquist pulse 422, the Nyquist pulse generator 420 may include a full Nyquist filter having a bandwidth of 25 Hz and an alpha (α) equal to 1.0. The Nyquist pulse signal 422 is inputted into amplitude control inputs of the oscillators 412a-412c. The function of the Nyquist pulse is a well-known operation of smoothing pulses. In this case, we are using the amplitude envelope of the Nyquist pulse, such that oscillation signals 426a, 426b, and 426c output from the oscillators 412a-412c can simultaneously be temporally and spectrally limited. It should be understood that other types of pulses could be utilized, including Gaussian or any other function capable of temporally and spectrally limiting a signal. The output oscillation signals 426a, 426b, and 426c of the oscillators 412a, 412b, and 412c are input lines 428a, 428b, and 428c into a summer 430. The summer operates to sum the three oscillation signals 426a-426c to generate a modulated audio signal 109 onto output line 432. It should be understood that the summer 430 may alternatively be a different computational element to produce a modulated audio signal consistent with the principles of the present invention. In one embodiment, noise (e.g., white noise) may be inputted into the summer 430 while the modem is operating to improve operation of a vocoder operating within a wireless device. It should be understood that such noise is not data (i.e., bits), but rather signal noise as understood in the art. In an alternative embodiment, the noise may be applied external from the modem, but before the vocoder. If the modem is external to the wireless device, the modulated audio signal 109 may now be inputted to a wireless device 110 (FIG. 1A), such as a cellular handset, for transmitting the modulated audio signal 109 over a voice channel to a wireless receiver 114, such as a cellular base station.

As an example operation of the modulator 108, the data packet 107 may have a binary value of 10110101. Serial-to-parallel converter 404 converts the data packet 107 to a byte of data communicated over bus 406. The binary value 10110101 is converted to byte 0xB5, which is the hexadecimal representation of the binary data. The three table entries for 0xB5 are 2 on line 414a, 5 on line 414b, and 9 on line 414c. The input of 2 to oscillator 412a causes it to generate an oscillation signal 426a having a frequency of 835.8 Hz. The Nyquist pulse on input line 424a shapes the envelope of the sinusoid so that it starts with amplitude zero, realizes full amplitude in the middle of the symbol, and ends with zero amplitude. Similarly, oscillators 412b and 412c generate oscillation signals 426b and 426c having frequencies of 1552.2 Hz and 2507.5 Hz, respectively, and their envelopes are similarly shaped. The three shaped oscillation signals 426a, 426b, and 426c are added together by summer 430 resulting in modulated audio signal 109 on output line 432.

Figure 5:
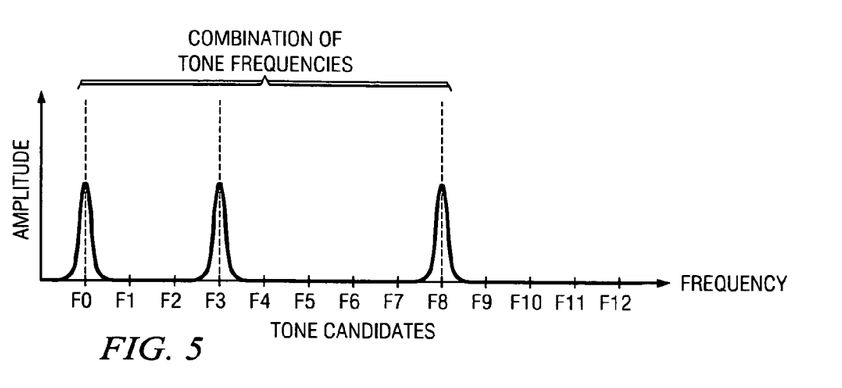
FIG. 5 is a graph showing multiple tones or frequencies selected for generating the modulated audio signal produced by the modulator of FIG. 4.

FIG. 5 is a graph showing multiple tones or frequencies selected for generating the modulated audio signal produced by the modulator of FIG. 4. As shown, there are thirteen candidate tones or frequencies F0-F12 from which three F0, F3, and F8, for example, or more may be selected to form the modulated audio signal having a harmonic structure, formant structure, and time-varying frequency spectrum to model a human voice. The frequencies may be separated by over 200 Hertz (Hz) between 300 and 3300 Hz. Alternatively, other frequencies may be utilized to form the formant structure and be in accordance with the principles of the present invention. The frequencies may be set as shown in TABLE I below.

TABLE I

| Local Oscillator | Frequency (Hz) |
|---|---|
| LO 0 | 300 |
| LO 1 | 526 |
| LO 2 | 753 |
| LO 3 | 980 |
| LO 4 | 1208 |
| LO 5 | 1437 |
| LO 6 | 1667 |
| LO 7 | 1901 |
| LO 8 | 2138 |
| LO 9 | 2382 |
| LO 10 | 2636 |
| LO 11 | 2906 |
| LO 12 | 3200 |

Figure 6:
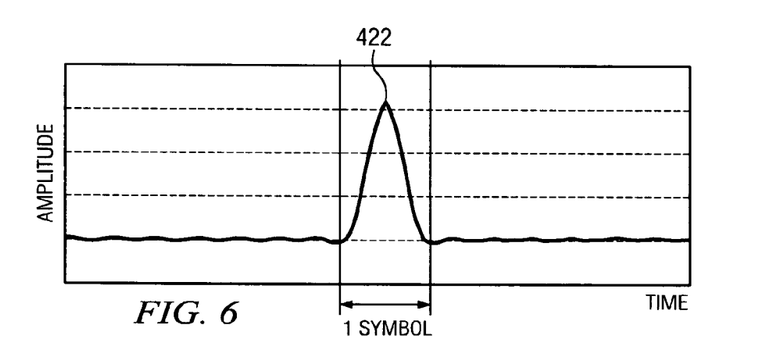
FIG. 6 is a graph showing an exemplary Nyquist pulse for use in generating modulation signals within the modulator of FIG. 4.

FIG. 6 is a graph showing an exemplary Nyquist pulse for use in generating modulation signals within the modulator of FIG. 4. The Nyquist pulse 422 is utilized to shape by smoothing the output oscillation signals 426a-426c (FIG. 4). In one embodiment, the Nyquist pulse 422 is set to $\alpha=1.0$, which sets up various parameters of a Nyquist pulse as understood in the art to generate a shape of the pulse envelope to limit both temporal and spectral content. The pulse duration represents the duration of 1-symbol and repeats with each symbol, thereby ensuring that each symbol is independent.

Figure 7:
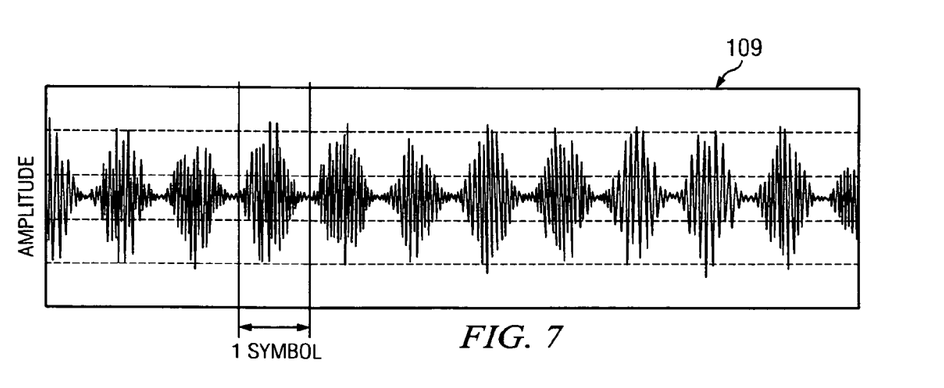
FIG. 7 is a graph showing a modulated audio signal with a series of symbols.

FIG. 7 is a graph showing a modulated audio signal 109 showing a series of symbols. The modulated audio signal 109 is shown to have multiple symbols as modulated by the Nyquist pulse 422 (FIG. 6). Because each encoded word may be different, each symbol shown has a different structure, thereby avoiding the corrupting effects of the vocoders from which conventional modem signals suffer.

One embodiment in accordance with the principles of the present invention transmits three frequencies or tones from a set of 13 candidate frequencies. However both the number of candidate tones and/or the number of transmitted tones can be changed. Raising the number of candidate tones and/or transmitted tones allows the modem to transmit more information bits per symbol, thereby increasing the bit rate. However, raising the number of candidate tones and/or transmitted tones decreases the Euclidean distance of the transmitted symbol set and increases the transmission error rate when passed through the vocoder. If the number of candidate or transmitted tones decreases, then the bit rate decreases, but the modem is more reliable. In another embodiment, one or more frequencies from a set of three or more candidate frequencies is generated and transmitted. The modem may use the same number of frequencies for each symbol communicated. For example, each symbol may include three frequencies. Further, a space, such as 50 ms, between each symbol may be imposed to ensure system stability and reliability.

Successful data transmission of the modulated signal 109 generated by the modem 104 (FIG. 1A), which includes the packet decoder 106 and modulator 108, is achieved, as the modulated audio signal 109 resembles human speech. The modulated audio signal 109, which now resembles human speech, causes the modulated audio signal 109 to be treated as a voice signal, instead of being discarded prior to transmission. Successful data transmission, as will be explained hereinafter, is also achieved as the data is encoded using perceptual aspects of human speech that are unaffected by the vocoder. These aspects are achieved as follows.

First, the frequency spectrum of the modulated audio signal 109 (data signal) should change substantially continuously. A basic characteristic of human speech is that the frequency spectrum changes continuously. Voice compressors, such as vocoders, exploit this characteristic and eliminate signals not resembling voice prior to compression, thereby improving both compression efficiency and fidelity. In developing the principles of the present invention, it was the understanding of these two principles (i.e., continuous change in the frequency spectrum of human speech characteristics and the attenuation or elimination of non-speech by the vocoder by noise reducing filters, such as Weiner filters), that lead to the discovery that data should have the substantially same characteristics as human speech (e.g., substantially continuous change in the frequency spectrum) to pass through vocoder without being corrupted. Any signal with an unchanged spectrum, when measured over a duration of several seconds, is classified as non-voice or "noise" and is eliminated by noise canceling filters. Classical modulation techniques, such as QPSK, QAM, or MSK, all have constant frequency spectrums and are therefore eliminated or severely attenuated by voice compressors. The modulated audio signal 109 according to the principles of the present invention occupies a broad frequency range and uses specific frequencies sporadically, thereby providing a substantially continuously-changing spectrum. Because the content of the data packet is substantially random, frequencies that are selected within the encoder table 408 (FIG. 4) are substantially random, which causes the symbols (FIG. 7) of the modulated audio signal 109 to be substantially continuously changing.

Second the frequency spectrum of the modulated audio signal 109 should not vary faster than the human vocal tract. Vocoders exploit the relatively slow rate of change of the vocal tract by updating the vocal tract parameters at a low rate, which is typically 50 to 100 Hz. If the frequency spectrum of the modulated audio signal 109 changes faster than the human vocal tract, than the update rate within the vocoder is insufficiently low and the data signal is interrupted. However, in accordance with the principles of the present invention, the modulated audio signal 109 updates the spectral envelope every 20 milliseconds (ms) or higher (e.g., 30 ms), which is sufficiently low to avoid being corrupted by vocoders in the communication path of wireless communication devices.

Third, the "formant" structure of the modulated audio signal 109 resembles human speech. A human voice typically has three spectral peaks, which are referred to as formants. The formants are produced by the human vocal cavity, and physical limitations of the vocal cavity limit the sharpness or frequency resolution and the number of formants. Vocoders model the frequency selective characteristics of the human vocal tract as an acoustic or equivalently an electrical filter of approximate order 10, which means that the filter has ten poles as understood to one skilled in the art. The formant structure, as considered in accordance with the principles of the present invention, may be represented using a ten-pole model.

Fourth, information is not contained in the instantaneous waveform of the modulated audio signal 109. Instead, the information is encoded using perceptual aspects of voice that are unaffected by the vocoder. Vocoders exploit the fact that the human ear is largely intolerant to signal phase and only mildly intolerant of small pitch variations, vocoders make only a minimal effort to reproduce the instantaneous waveform of the input signal. The vocoder does attempt to reproduce pitch (though not phase) and formant structure because they convey linguistic information as well as information used for speaker recognition. In accordance with the principles of the present invention, the modem encodes information using pitch and formant structure and, therefore, does not depend on the instantaneous waveform.

Fifth, the signal should have pitch, which refers to a uniformly-spaced series of frequency-domain harmonics of a fundamental frequency. Vocoders can easily represent a uniformly-spaced series of harmonics because of their adaptive codebook. But, if a signal contains multiple non-harmonically-related sinusoids, it is difficult for the vocoder to represent such a signal and fidelity suffers. The modulated audio signal 109, according to the principles of the present invention, refers to uniformly-spaced series of harmonics, thereby allowing for the vocoder to exploit pitch properties.

Figure 8:
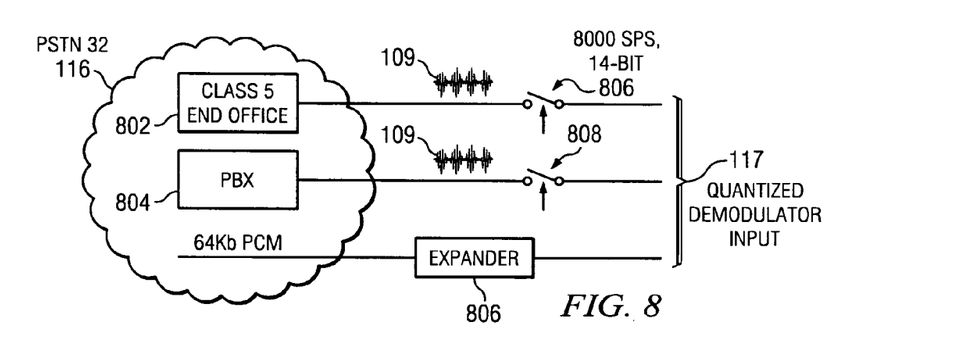
FIG. 8 is a block diagram showing a portion of the communications system of FIG. 1A.

FIG. 8 is a block diagram showing a portion of the communications system 100 of FIG. 1A. The PSTN 116 receives the modulated audio signal 109 (FIG. 7) through any one of (i) a class 5 end office 802, (ii) Private Branch Exchange ("PBX") 804, or (iii) 64 Kb PCM. If the modulated audio signal is an analog signal and passed through the class 5 end office 802, or if it is an analog signal from the PBX 804, samplers 806 or 808, respectively, are utilized to sample the modulated audio signal 109 at 8,000 samples per second using a 14-bit quantizier. If the modulated audio signal 109 is companded as a 64 Kb PCM signal, then the compressed samples are converted to linearly spaced 14-bit samples with expander 806. Note that the operations of compression and expansion (hence the term compand) in the PSTN 116 are entirely separate from the voice compression in expansion operations associated with the vocoder. The input to the demodulator 118 (FIG. 1A) is a succession of 14-bit digitized samples at 8,000 samples per second.

Figure 9:
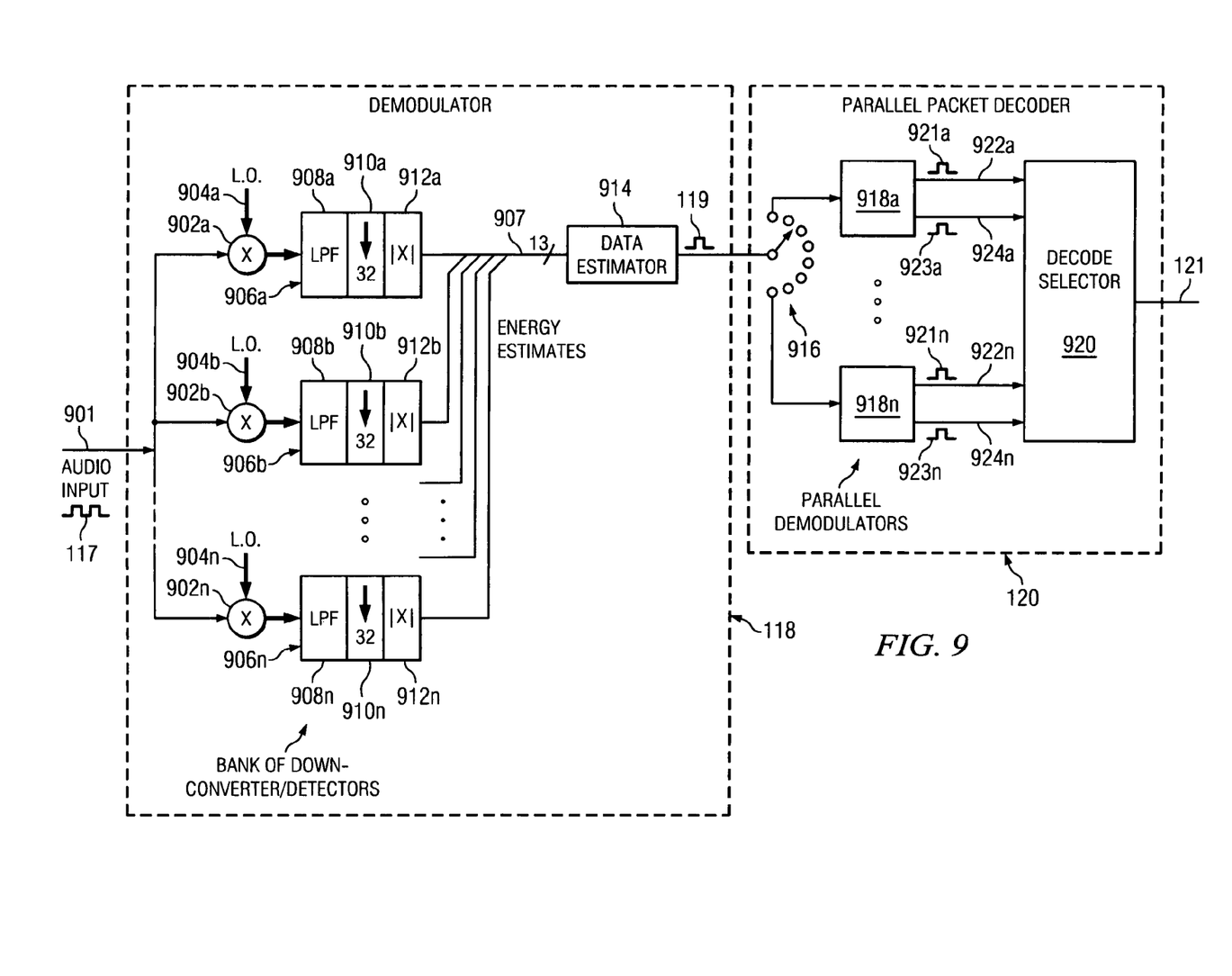
FIG. 9 is a block diagram of an exemplary demodulator for use in demodulating a modulated audio signal communicated over a voice channel of a communications system, such as the communications system of FIG. 1A.

FIG. 9 is a block diagram of an exemplary demodulator 118 and packet decoder 120 and is used in demodulating a modulated audio signal 109 (FIG. 7) communicated over a voice channel of a communications system, such as the communications system of FIG. 1A, and decoding the demodulated signal 119. The demodulator 118 receives quantized audio signal 117 on input line 901. The input line may carry the quantized audio signal 117 to multiple mixers or down converters 902a-902n (collectively 902). The mixers 902 may be in parallel and receive another input from local oscillators 904a-904n (collectively 904). The frequencies from the local oscillators 904 are the candidate tone frequencies provided in FIG. 5 and TABLE I. In the case of using thirteen frequencies, there may be thirteen mixers 902 formed in parallel, where each mixer receives a signal having a local oscillator to provide a candidate tone frequency for down-converting. That is, each mixer 902 down-converts the quantized audio signal 117 by an amount equal to the frequency of the respective local oscillator so that a mixer input at the local oscillator frequency produces a complex baseband or direct current (DC) signal at the output of the mixer.

Each of the mixers 902 is followed by a lowpass filter 908a-908n (collectively 908) to remove mixing terms caused by the down-conversion and to reject neighboring tones. The bandwidth of the lowpass filter may be approximately 80 Hz, which is large enough to pass a tone pulse envelope of a symbol of the modulated audio signaling, but narrow enough to reject neighboring tones of the tone candidates. In one embodiment, cascade integrator comb ("CIC") filters may be utilized to minimize the computational load of a DSP executing software for implementing the demodulator 118 as understood in the art. Alternatively, the demodulator may be implemented by using discrete logic, a general purpose processor, or other implementation as understood in the art. Since the bandwidth of the outputs of the lowpass filters is significantly lower than the bandwidth of the inputs, the sample rate may be reduced by decimators 910a-910n (collectively 910) to ten times the sample rate or 250 Hz. The lower symbol rate reduces the computational load of the DSP further and also enables convenient parallel packet decoding as described further herein. Each of the lowpass filters 908 and decimators 910 may be followed by a detector 912a-912n (collectively 912) for computing the magnitude of the complex baseband signal. For example, if the input signals are tones at F0, F1, and F2, than the outputs of the down-converter/detectors with local oscillator frequencies F0, F1, and F2 are proportional to the energy of the input tones at F0, F1, and F2. The output of all other down-converters/detectors 908, 910 and 912 are significantly lower because no energy is detected at the frequencies of the local oscillators 904.

The thirteen energy estimates generated from the down-converter/detectors 908, 910, and 912 are fed over a bus 907 to a data estimator 914. The data estimator 914 determines the most likely trio of transmitted tones of the modulated audio signal 109 (FIG. 1A) and, given the current energy estimates, outputs a data estimate signal 915 including bytes of data. The data estimator 914 follows the process provided in FIG. 10.

Figure 10:
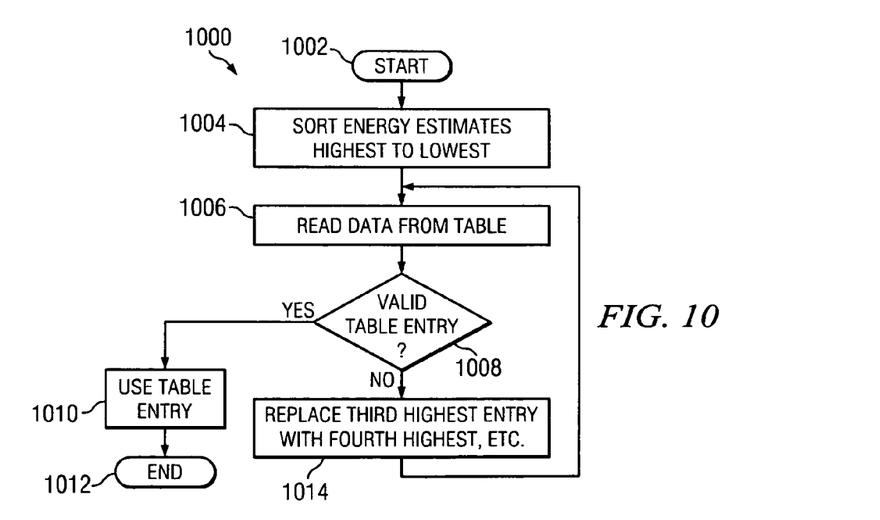
FIG. 10 is a flow chart showing an exemplary process for determining data contained in the modulated audio signal of FIG. 7.

FIG. 10 is a flow chart showing an exemplary process for determining data contained in the modulated audio signal of FIG. 7. The process starts at step 1002. At step 1004, energy estimates are sorted, highest to lowest, for example, and indexes corresponding to the three frequencies corresponding to the three highest magnitudes are determined to be the estimate by the demodulator of the three frequencies originally sent by the transmitter (i.e., frequencies encoded into the modulated audio signal 109 of FIG. 1A). At step 1006, data is read from a look-up table to determine whether the combination of frequencies is valid at step 1008. In determining whether the combination of frequencies is valid, a priori knowledge is utilized in that it is known that thirty combinations are unused. If it is determined that the data is a valid table entry at step 1008, then at step 1010, a table entry is used and the data estimator 914 (FIG. 9) returns the estimated transmitted byte. The process ends at step 1012. Using this process, the demodulator determines the most likely trio of tones transmitted by the modulator. Since the modem selects the three strongest tones within the set of allowable tone trios (i.e., of the 256) stored by the modulator, this determination is performed without determining presence or absence of individual tones.

If the look-up table results indicate an invalid combination at step 1008, then at step 1014, the third highest entry is replaced with a fourth highest entry, thereby operating as a waveform error corrector. The process then repeats at step 1006 and continues until a valid table entry is found, thereby forming a valid combination.

The data estimator 914 of FIG. 9 outputs the demodulated signal 119. The samples are inputted to a commutator 916. The commutator 916 routes the bytes of the demodulated signal 119 at ten times the sample rate to ten parallel packet decoders 918a-918n (collectively 918). Each of the packet decoders 918 performs the inverse of the packet encoder 106 (FIG. 2). The commutator 916 switches with each byte of the demodulated signal 119. Since the sample rate is ten times the symbol rate, each parallel demodulator is fed with bytes of the demodulated signal 119 taken at the same phase of each symbol, and the sample rate of each symbol is also the symbol rate. For example, one of the parallel packet decoders 918a that receives bytes taken at the center of a symbol has a better chance of being decoded than another parallel packet decoder

918b that samples between or at the edge of symbols. Frequently, a group of consecutive phases is all decoded correctly.

Each of the ten parallel demodulators 918a-918n (collectively 918) accepts a data stream at a symbol and sample rate and performs the inverse operation of the packet encoder 106 (FIG. 1A). The first decoding step is sync word detection. When the sync word detector detects the sync word within a sync word error tolerance, it activates the error corrector, the de-randomizer, and the CRC detector. If these operations are successful as evidenced by a successful CRC test, then demodulation of a packet outputted onto output line 922a from the parallel demodulator 918a was successful and the resulting data should match what was originally transmitted. Correctly decoded packets 921a on output line 922a are passed to decode selector 920 along with error correction results or statistics 923a output from the demodulator 918a on output line 924a. Incorrectly decoded packets on the output line of other parallel demodulators, such as incorrectly decoded packets 921n on output line 922n from parallel demodulator 918n, are not passed to the decode selector 920. In other words, packets that are decoded incorrectly due to data errors are simply not passed to the decode selector 920 for decoding.

In most cases, the multiple parallel demodulators 918 successfully decode the packet. An error corrector within the demodulator provides the number of errors corrected that may be used to realize additional performance from the architecture of the parallel packet decoders 918. The packet with the least number of corrected errors, as determined by the number of errors corrected, is selected as a maximal likelihood estimate of the transmitted data packet. The decode selector 920 examines the error correction results 923a output from demodulator 918a onto output line 924a and picks the results that require the least amount of correction. The output of the decoder selector 914 is data 121 that should match the original data 103 (FIG. 1A).

Parallel packet decoding substantially eliminates the need for a timing recovery servo loop at the demodulator. While timing recovery is a typical operation in demodulators, corruption of the signal by the vocoder makes it impractical or impossible for the modem to handle according to the principles of the present invention.

While the principles of the present invention have been described using the encoder and modulator, certain embodiments may alternatively use frequency shift keying ("FSK"). FSK is resilient to time and pitch warping. In one embodiment, FSK may be used for bit rates of 900 bits per second. However, FSK has a non-time-varying spectrum and is therefore subject to attenuation by noise suppressors. That being said, the attenuation may be overcome by varying the modulation index dynamically as it is known that different FSK modulation indices create various spectral peaks that may be voice-like. Digital spectral encoding may also be employed to shape the spectrum. The use of FSK may overcome the "constant spectrum" problem of conventional vocoders in accordance with other aspects of the embodiments described.

In yet another embodiment, amplitude shift keying ("ASK") may be utilized. ASK uses a voice compressor's ability to react quickly to speech plosives. In this scenario, the spectrum of the data may be manipulated by digital spectral precoding as responsive to voice plosives is inherent in vocoders.

Specific embodiments according to the principles of the present invention have been described for the purpose of illustrating the manner in which the invention may be made and used. For example, the principles of the present invention may be utilized on other communication systems that utilize vocoders or other voice compression technology. In addition, the principles of the present invention may be utilized by wireless devices other than cellular handsets or mobile telephones. Further, the implementations may vary and operate on a variety of hardware and software systems as understood in the art.

What is claimed is:

1. A modulator for modulating data, said modulator comprising:
    an encoder configured to select at least one frequency from at least three or more candidate frequencies and configured to store combinations of two or more frequencies composed of three or more candidate frequencies, wherein said encoder outputs a plurality of signals substantially simultaneously to at least two oscillators to produce respective oscillation signals; and
    a computational element in communication with said at least two oscillators and configured to receive the respective oscillation signals and produce a modulated audio signal based on the respective oscillation signals, wherein the respective oscillation signals are the same in number for each modulated audio signal.

2. The modulator according to claim 1, wherein said at least two oscillators is three oscillators configured in parallel.

3. The modulator according to claim 1, wherein said encoder includes an encoder table having at least 256 entries of candidate frequency combinations.

4. The modulator according to claim 1, wherein the modulated audio signal has a harmonic structure substantially similar to a pitched voice signal, a formant structure substantially similar to a formant structure produced by a human vocal tract, and a time-varying frequency spectrum.

5. The modulator according to claim 1, wherein said computational element is a summer.

6. The modulator according to claim 1, wherein said modulator is configured in a wireless device.

7. The modulator according to claim 1, wherein the number of oscillation signals is three and the number of candidate frequencies is thirteen.

8. The modulator according to claim 7, wherein said electronic device receives an 8-bit input signal to select from 256 combinations of the thirteen candidate frequencies.

9. The modulator according to claim 1, wherein the modulated audio includes a series of harmonics of a fundamental frequency.

10. A modem, comprising:
    a modulator including:
        an encoder configured to select at least one frequency from at least three or more candidate frequencies and configured to store combinations of two or more frequencies composed of three or more candidate frequencies, said encoder includes an encoder table having at least 256 entries of candidate frequency combinations;
        at least one oscillator in communication with said encoder and configured to generate respective oscillation signals in response to receiving the two or more frequencies from said encoder; and
        a computational element in communication with said at least one oscillator and configured to receive the respective oscillation signals and produce a modulated audio signal based on the respective oscillation signal, wherein the respective oscillation signals are the same in number for each modulated audio signal.

11. The modem according to claim 10, further comprising a packet encoder in communication with said modulator and configured to receive source data to be communicated, said packet encoder encoding the received source data into a data packet and communicating the data packet to said encoder.

12. The modem according to claim 10, wherein the modulated audio includes a series of harmonics of a fundamental frequency.

* * * * *